United States Patent

Oshima et al.

[11] Patent Number: 6,139,784
[45] Date of Patent: *Oct. 31, 2000

[54] PROCESS FOR A SEAMLESS BELT CONTAINING A POLYIMIDE RESIN FOR USE IN A COPYING MACHINE

[75] Inventors: Tetsuhiro Oshima, Kusatsu; Kenichi Omoto, Kyoto, both of Japan

[73] Assignee: Gunze Limited, Ayabe, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/424,622

[22] PCT Filed: Sep. 18, 1992

[86] PCT No.: PCT/JP92/01197

§ 371 Date: Apr. 28, 1993

§ 102(e) Date: Apr. 28, 1993

Related U.S. Application Data

[63] Continuation of application No. 08/039,248, Apr. 28, 1993, abandoned.

[30] Foreign Application Priority Data

Sep. 21, 1991 [JP] Japan ..................................... 3-315560

[51] Int. Cl.[7] ........................... B29C 41/04; B29C 67/24; B29C 70/60
[52] U.S. Cl. ........................... 264/104; 264/114; 264/115; 264/128
[58] Field of Search ................................ 198/691, 844.1; 271/193; 428/36.9, 36.92, 34.1, 408, 473.5; 264/104, 114, 115, 128, 140

[56] References Cited

U.S. PATENT DOCUMENTS

| | | | |
|---|---|---|---|
| 4,606,955 | 8/1986 | Eastman et al. | 428/35.7 |
| 4,681,712 | 7/1987 | Sakakibara et al. | 264/104 |
| 5,021,036 | 6/1991 | Tanaka et al. | 474/237 |
| 5,876,647 | 3/1999 | Makise et al. | 264/105 |

FOREIGN PATENT DOCUMENTS

| | | |
|---|---|---|
| 56-154772 | 11/1981 | Japan . |
| 61-095361 | 5/1986 | Japan . |
| 61-144658 | 7/1986 | Japan . |
| 61-202811 | 8/1986 | Japan . |
| 62-3980 | 1/1987 | Japan . |
| 63-311263 | 2/1988 | Japan . |
| 3-89357 | 4/1991 | Japan . |
| 3-106616 | 6/1991 | Japan . |
| 4-93210 | 3/1992 | Japan . |
| 2166370A | 5/1986 | United Kingdom . |

*Primary Examiner*—Angela Ortiz
*Attorney, Agent, or Firm*—Armstrong, Westerman, Hattori, McLeland & Naughton

[57] ABSTRACT

The invention has for its object to provide a seamless belt comprising a polyimide resin and an electrically conductive powder. The seamless belt of the invention is one containing a polyimide resin and an electrically conductive powder and obtainable by, for example, centrifugal molding or the like. The seamless belt of the invention is minimal in variation of electric resistance value, excellent in mechanical and other physical properties and can be expected to find broad application as, for example, the functional belt of an electron photographic copying machine.

2 Claims, 3 Drawing Sheets

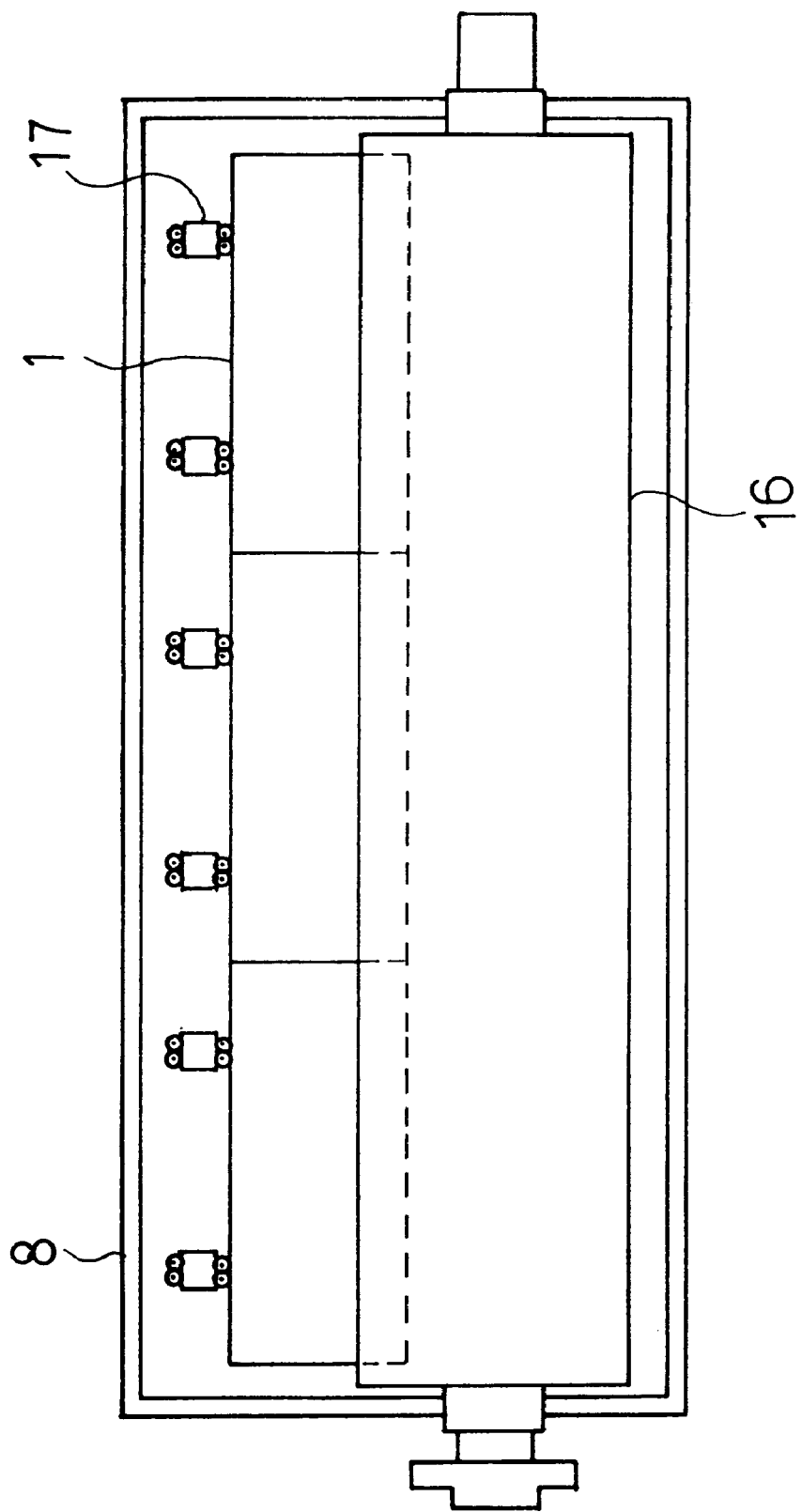

PROCESS FOR A SEAMLESS BELT CONTAINING A POLYIMIDE RESIN FOR USE IN A COPYING MACHINE

This application is a Continuation of application of Ser. No. 08/039,248 filed Apr. 28, 1993, now abandoned.

TECHNICAL FIELD

The present invention relates to a seamless belt having a substantially uniform volume or surface electric resistance value (hereinafter referred to sometimes as 'electric resistance value').

BACKGROUND ART

While a variety of electrically conductive seamless belts are heretofore available, most of them are not free of variation in electric resistance or are inadequate in mechanical and other properties. The cause is the poor and uneven blending of electrically conductive powders with organic polymer materials. In addition, there are cases in which the mechanical characteristics are adversely affected by the very addition of such conductive powders. The seamless belt of this kind is manufactured by extrusion molding, centrifugal molding or the like. However, extrusion molding generally tends to cause a variation in thickness or electric resistance as well as compromised mechanical properties and centrifugal molding tends to a cause a gradient in electric resistance between the external and internal surfaces of the belt due to a difference in specific gravity between the different materials admixed, hence causing the above-mentioned drawbacks.

The object of the present invention is to provide a seamless belt with a minimum of variation in electric resistance value and having very satisfactory mechanical and other physical properties.

DISCLOSURE OF THE INVENTION

The present invention is directed to (1) a seamless belt comprising a polyimide resin and an electrically conductive powder characterized in that the volume electric resistance values in various parts of the belt are within the range of $10^{-1} \sim 10^{13}$ Ω·cm and the maximum value of volume electric resistance is within the range of 1 to 10 times the minimum value (hereinafter referred to 'seamless belt A') and (2) a seamless belt comprising a polyimide resin and an electrically conductive powder as manufactured by centrifugal molding, characterized in that the surface electric resistance values in various parts of the external and internal surfaces of the belt are within the range of $1 \sim 10^{13}$ Ω/□ (ohm/square units) and the maximum value of surface electric resistance is within the range of 1 to 100 times the minimum value (hereinafter referred to as "seamless belt B"). Each of these seamless belts A and B is further characterized in that compared with a seamless belt which is identical in shape but is manufactured from a raw material which does not contain said electrically conductive powder, its tensile strength value, 200° C.×1 hour thermal shrinkage rates in the transverse and circumferential directions thereof and flexurural resistance value can be controlled to preferably not less than 50% and more preferably not less than 75%. However, these values are not critical and may be any other values depending on the intended use.

In the present invention, the polyimide resin includes but is not limited to thermoplastic polyimide resins and thermosetting polyimide resins such as polyimides and polyamideimides. Moreover, precursors of such thermosetting polyimide resins are also subsumed in the concept of the thermosetting polyimide resin of the invention.

In the present invention, the electrically conductive powder may be any electrically conductive or semi-conductive powder, with no particular restriction, and a broad range of fine powders including carbon blacks such as kitchen black (contactive furnace carbon black), acetylene black, etc., stannic oxide, indium oxide, potassium titanate and other types of conductive and semi-conductive powders can be liberally employed. Among these powders, acetylene black which has a specific gravity of about 1.82 is generally preferred because of its excellent compatibility with polyimide resins. Kitchen black which has a specific gravity of about 1.95 is also tending to be used with advantage. In other words, it is preferable to employ an electrically conductive powder having a specific gravity close to that of the polyimide resin if only for reducing the variation in the electric resistance value. For example, an electrically conductive powder having a specific gravity in the range of about 75 to 125% of the specific gravity of polyimide resin is preferred, although this is not a critical range.

In the present invention, the amount of such an electrically conductive powder is not critical only if the predetermined electric resistance value can be obtained. Generally, however, it is advantageous to use the electrically conductive powder in a proportion of about 1 to 30% by weight, preferably about 5 to 20% by weight, based on the total amount of the polyimide resin or the effective ingredient of its precursor and the electrically conductive powder.

The seamless belt of the present invention can be manufactured by, for example, the following method.

The raw material prepared by mixing an electrically conductive powder in a polyimide resin is preferably used in the form of a slurry, such as one prepared by dispersing them with the addition of a solvent or the like and the seamless belt of the invention is manufactured by the centrifugal molding technique or the like using the above slurry. There is no limitation on the method for dispersing the electrically conductive powder in the polyimide resin with the addition of a solvent, and any known method can be liberally utilized. The solvent mentioned above can be liberally selected from among the known solvents which are capable of dissolving the polyimide resin. Thus, polar organic solvents, e.g. N,N-dimethylacetamide, dimethylformamide, dimethyl sulfoxide, N-methyl-2-pyrrolidone, diethylene glycol dimethyl ether, pyridine, dimethylsulfone, etc. and other organic solvents, e.g. dichloromethane, trichloromethane, dioxane, toluene, etc. can be mentioned.

Alternatively, the seamless belt of the present invention can also be manufactured from a raw material prepared by dispersing the electrically conductive powder in the polyimide resin, for example by centrifugal molding. There is no particular limitation on the method of dispersing the electrically conductive powder in the polyimide resin. Thus, the polyimide resin and electrically conductive powder may be physically or mechanically admixed, specifically by the mechanofusion process or the hybridization process, for instance. It is also possible to use such a process in combination with the ball mill or sand mill method or with ultrasonic dispersion. If necessary, a suitable solvent may be mixed into the raw material. For insuring the ease of handling, the raw material mixed as above may be subjected to a suitable treatment. For example, in order to facilitate deposition on the internal wall of the cylinder, the mixed raw material may be used as dissolved in a solvent similar to that mentioned above. Or the raw material may be somewhat wetted to prevent scattering.

As a more effective mixing method, a mix-stirring method using an Aquamizer (Hosokawa Micron Co., Ltd.) may be mentioned. The Aquamizer is a batch-type wet medium-stirring pulverizer and its principle of operation is that the raw material (the slurry containing the polyimide resin and electrically conductive powder) as well as balls about a few millimeters in diameter are agitated in a tank by a stirring rotor to pulverize the raw material by force. In this process, the liquid raw material (slurry) is subjected to the impact, shearing and grinding forces arising from collision of the balls, whereby the polyimide resin and electrically conductive powder are evenly pulverized and dispersed.

The viscosity of the liquid raw material thus obtained is important for insuring the manufacture of a belt with a reduced variation in electric resistance value and the preferred viscosity range is generally about 50 to about 4000 cp and more desirably about 100 to about 500 cp. For the preparation of a starting slurry having such a viscosity value, the size of Aquamizer medium balls is preferably controlled to about 1~10 mm and more advantageously to about 2~7 mm. Of course, the above viscosity and ball diameter values are not critical and appropriate values can be adopted.

In the present invention, a compatibilizer may be added, if necessary, at the stage of admixing the polyimide resin and electrically conductive powder. The level of addition of the compatibilizer is not critical, either, but is generally about 0.5 to about 5% by weight and preferably about 0.5 to about 3% by weight relative to the total amount of the polyimide resin and electrically conductive powder. The kind of such compatibilizer is not critical but, for example, titanate type coupling agents and nonionic surfactants can be mentioned.

The seamless belt of the present invention may be manufactured from a raw material consisting in a mixture of the polyimide resin and electrically conductive powder only or a raw material which additionally contains an appropriate third component. The third component may for example be a resin, such as a fluorine-containing resin, which is preferably in finely divided state, or a silicone oil.

While the seamless belt of the present invention is preferably a belt manufactured by centrifugal molding, it may be a belt manufactured by any other suitable method such as extrusion molding.

As is well known, centrifugal molding is a technology for manufacturing a cylindrical resin sheet, which is seamless, by means of the centrifugal force of a revolving cylinder. For the manufacture of the seamless belt of the invention, the rotational speed of the cylinder is not critical but can be selected from a broad range which, for example, is preferably 500 to 1500 rpm and more preferably 800 to 1200 rpm.

A specific example of the centrifugal molding method which can be employed in the present invention is now described with reference to the accompanying drawings.

First, as required, a parting agent, which may be of fluorine type or of silicon type, is applied to an internal surface 2 of a cylinder 1 and the raw material, for example one previously dissolved in a solvent, is supplied from an applicator unit 11 onto the internal surface of the cylinder 1. When the cylinder 1 is rotated slowly in this stage, the raw material can be deposited uniformly. Then, the cylinder 1 is driven at a high speed and, at the same time, heated with a heater 8 to a predetermined temperature, whereby the solvent is removed and the resin is heat-set. In this manner, there is obtained a cylindrical molding. Then, the cylinder 1 is cooled and the molding is withdrawn from the cylinder 1 to provide a seamless belt of the invention. The applicator unit 11 is supplied with the raw material via a flexible pipe 12 and is so configured and dimensioned that it can be freely inserted into the cylinder 1 and be displaced toward the internal surface 2 of the cylinder 1 as illustrated in FIG. 3 to apply the raw material to the internal surface of the cylinder 1 through the slit 15. The above apparatus is an example of centrifugal molding apparatus to which the present invention is not limited.

As an alternative, the seamless belt of the present invention can also be manufactured using the apparatus illustrated in FIGS. 4 and 5. In this apparatus, a cylinder 1 is disposed on a pair of driving rolls 16,16 and allowed to revolve in stable condition under the influence of a biasing roll set 17. The numeral 8 represents a heater and the numeral 18 represents an auxiliary heater such as an infrared heater. The cylinder 1 is overriding the rolls 16,16 and has a suitable structure, though not shown, for preventing its lateral deflection.

While the raw material can be applied onto the inner surface of the cylinder 1 by the method illustrated in FIGS. 2 and 3, for instance, scraper coating or the like can also be adopted. Thus, there is no particular limitation on the coating procedure.

Referring to the seamless belt A of the invention, it is important that the volume electric resistance values in various parts of the belt are within the range of $10^{-1}$~$10^{13}$ $\Omega \cdot cm$, preferably 1~$10^8$ $\Omega cm$, and the maximum value of volume electric resistance is within the range of 1~10 times the minimum value.

As to the seamless belt B of the present invention, the surface electric resistance values in various areas of the external and internal surfaces of the belt are within the range of 1~$10^{13}$ $\Omega/\square$, preferably $10^3$~$10^{10}$ $\Omega/\square$ and the maximum value of surface electric resistance is within the range of 1~100 times the minimum value.

While the seamless belt of the present invention must have volume or surface electric resistance values within said defined range, the attainment of such electric resistance values are often closely associated with the method of preparing a raw material comprising a dispersion of the electrically conductive powder in the organic polymer material, the surface condition of the centrifugal machine cylinder, the rotational speed of the cylinder, and other factors.

There is no particular limitation on the surface roughness of the seamless belt of the invention. However, it is preferably not greater than $2\mu$ and more preferably not greater than $1 \mu$.

The uses for the seamless belt of the present invention are not limited, but as preferred applications, broad usage is expected as the substrate material for copying machine or other photosensitive belts (electron photographic sensitive material), substrate materials for image transfer belts, fixation belts, printer recording belts for office automation equipment, etc., that is to say the so-called functional belts. For use as such a functional belt, the seamless belt of the invention can be electrically grounded to its internal surface by applying an electric charge to its external surface so that the device can be made compact. It is also apply such an electric charge from the internal surface. Therefore, the belt can exhibit multiple-functionality.

BRIEF DESCRIPTION OF THE DRAWINGS

FIG. 4 is a side sectional view showing another exemplary cardinal part of a centrifugal molding apparatus.

Figure 1:
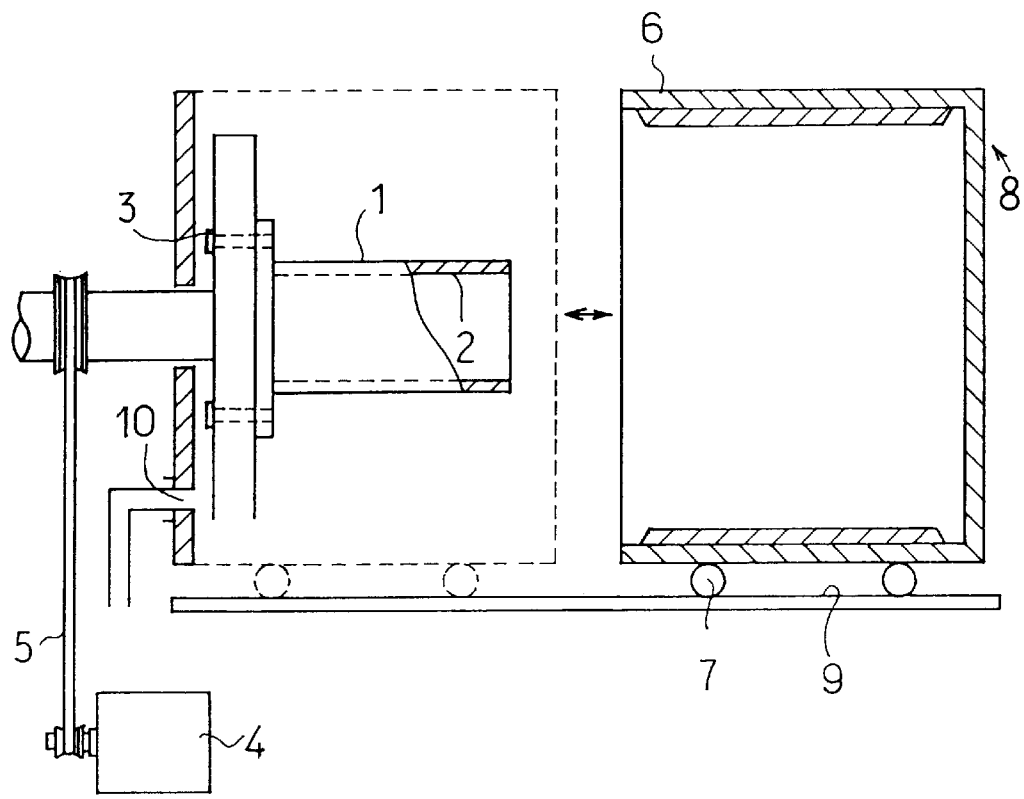
FIG. 1 is a front sectional view showing an exemplary cardinal part of a centrifugal molding apparatus.
Figure 2:
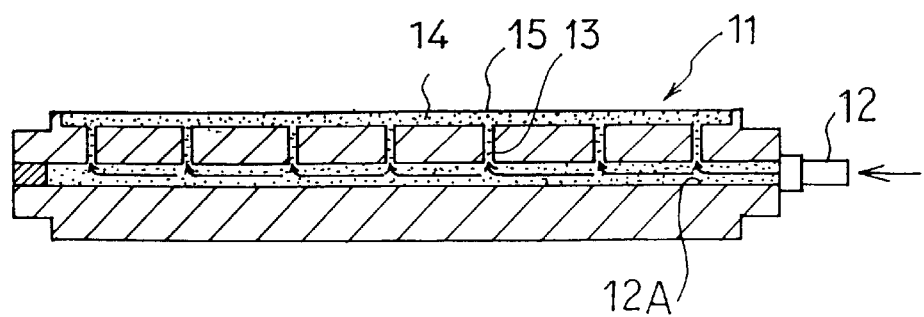
FIG. 2 is a sectional view showing an exemplary slurry applicator unit.
Figure 3:
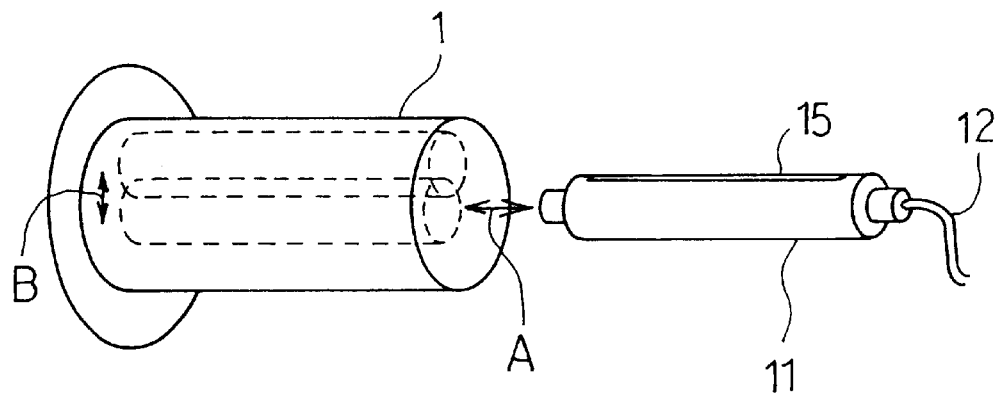
FIG. 3 is a perspective view showing an exemplary centrifugal molding apparatus.

(1)—Cylinder
(2)—Internal wall of cylinder
(3)—Pin (dismountable)
(4)—Motor
(5)—Belt
(6)—Cylinder hood
(7)—Castor
(8)—Heater
(9)—Rail
(10)—Inert gas purging pipe hole
(11)—Applicator unit
(12)—Flexible pipe
(12A)—Channel in internal wall of applicator unit
(13)—Slot
(14)—Slurry reservoir
(15)—Slit
(16)—Roller
(17)—Biasing roll
(18)—Auxiliary heater
(A)—Arrowmark indicating the lateral displaceability of applicator unit 11
(B)—Arrowmark indicating the vertical displaceability of applicator unit 11 (displaced upward for application)

BEST MODE FOR CARRYING OUT THE INVENTION

The following examples are intended to describe the invention in further detail.

EXAMPLE 1

To 600 g (effective solids content 15% by weight) of polyamic acid, a precursor of polyimide resin, was added 600 g of N,N-dimethylacetamide and the viscosity of the resulting solution of polyamic acid was adjusted to 150 cp. To this solution was added 7.2 g of acetylene black and the mixture was stirred and mixed using an Aquamizer (manufactured by Hosokawa Micron Co.) to provide a raw material slurry. The mixing conditions were: a total of 4 kg of alumina balls 5 mm in diameter, rotational speed 200 rpm, treating time 30 minutes, slurry viscosity about 200 cp.

Figure 5:
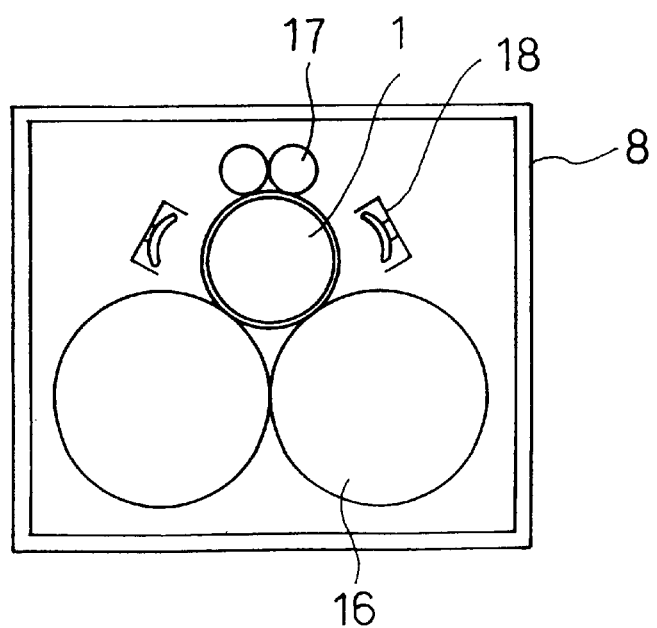
FIG. 5 is a front sectional view showing another exemplary cardinal part of a centrifugal molding apparatus.

This raw material slurry, 36 g, was taken and molded using the centrifugal molding apparatus shown in FIGS. 4 and 5 to provide a seamless polyamic acid film. The conditions were: the temperature increased gradually and held at 120° C.×30 minutes and the cylinder speed 1000 rpm. The polyamic acid film thus obtained was heated in a hot air dryer at a final temperature of 400° C.×10 minutes for thorough imidation to provide an electrically conductive seamless belt 100 mm in diameter, 300 mm wide and 50μ in thickness.

EXAMPLE 2

To a polyamic acid solution prepared by the procedure described in Example 1 was added 13.5 g of kitchen black EC and the mixture was stirred using the same apparatus under the same conditions as in Example 1 to provide a raw material slurry having a viscosity of about 300 cp.

This slurry, 22 g, was taken, centrifugally molded and heat-treated under the same conditions as Example 1 to provide an electrically conductive seamless belt 72 mm in diameter, 300 mm wide and 40 μ thick.

COMPARATIVE EXAMPLE

The procedure of Example 1 was repeated except that the addition of acetylene black was omitted to provide a seamless belt of the same size as that of Example 1.

Using each of the seamless belts obtained in Example 1, Example 2 and Comparative Example, the volume electric resistance value, surface electric resistance value, tensile strength, elongation at break, thermal shrinkage rate and flexural resistance value were measured. The results are shown in Table 1. The tensile strength was measured in accordance with JIS-K7113, elongation at break in accordance with JIS-K7113, flexural resistance value in accordance with JIS-P8115 (MIT flexural fatigue resistance tester), and volume electric resistance and surface electric resistance values in accordance with JIS-K6911. The thermal shrinkage rate is the value measured in the air at 200° C. for 1 hour in each of the transverse and circumferential direction of the belt.

TABLE 1

| | | Example 1 | Example 2 | Comparative Example |
|---|---|---|---|---|
| Volume electric resistance value (Ω·cm) | | $1.0 \times 10^4$ ~$6.0 \times 10^4$ | $2.3 \times 10^2$ ~$4.5 \times 10^2$ | $10^{15}$ |
| Surface electric resistance value (Ω/□) | External surface | $2.0 \times 10^5$ ~$8.0 \times 10^5$ | $5.0 \times 10^2$ ~$1.5 \times 10^3$ | >$10^{13}$ |
| | Internal surface | $1.5 \times 10^5$ ~$5.0 \times 10^5$ | $9.2 \times 10^2$ ~$1.5 \times 10^3$ | >$10^{13}$ |
| Tensile strength (kg/mm$^2$) | | 24 | 22 | 25 |
| Elongation at break (%) | | 20 | 15 | 30 |
| Thermal shrinkage (%) 200° C. × 1 hour | | <0.2 each | <0.2 each | <0.2 each |
| Flexural resistance value (times) | | 45000 | 38000 | 50000 |

From the values presented in Table 1 it is clear that the seamless belt of the invention has extraordinary merits.

The seamless belt of the present invention is not only minimal in the variation in electric resistance value but is excellent in mechanical characteristics and can, therefore, be expected to meet a broad demand in a variety of applications inclusive of functional belts for copying machines.

What is claimed is:

1. A process for producing a seamless belt, which comprises the steps of:

i) feeding a precursor of a thermosetting polyimide resin, an electrically conductive powder, a solvent and balls into a tank of a wet medium-stirring pulverizer equipped with a stirring rotor, the amount of the electrically conductive powder being 5 to 20% by weight based on the total weight of the polyimide precursor and the electrically conductive powder;

ii) forcibly agitating a mixture of the polyimide precursor, the electrically conductive powder and the solvent together with the balls using the stirring rotor so that by impact, shearing and grinding forces arising from collision of the balls, the polyimide precursor and the electrically conductive powder are pulverized into fine particles and uniformly dispersed in the solvent to form a slurry; and iii) centrifugally molding the resulting slurry into a cylindrical shape with heating so as to remove the solvent and convert the polyimide precursor into a polyimide resin and form the seamless belt; the seamless belt having the characteristics that volume electric resistance values in various parts of the belt are within the range of $10^{-1}$ to $10^{13}$ Ω·cm, that a maximum value of volume electric resistance is within the range of 1 to 10 times the minimum value, that surface electric resistance values in various parts of external and internal surfaces of the belt are within the range of 1 to $10^{13}$ Ω/□ (ohm/square units), and that a maximum value of surface electric resistance is within the range of 1 to 100 times the minimum value.

2. The process for producing a seamless belt according to claim 1 wherein the balls used in step i) are 2 to 7 mm in diameter.

\* \* \* \* \*